United States Patent
Miller et al.

[15] 3,649,182
[45] Mar. 14, 1972

[54] REDUCTION OF PYROSULFITE

[72] Inventors: Leo A. Miller; James A. Taylor; Thomas M. Willard, all of Lakeland, Fla.

[73] Assignee: Wellman-Lord, Inc.

[22] Filed: Dec. 24, 1968

[21] Appl. No.: 786,756

[52] U.S. Cl. ............................23/137, 23/177, 23/178, 23/2 SQ
[51] Int. Cl. ...............................C01b 17/28, C01b 17/50
[58] Field of Search...............23/2, 61, 134, 130, 177, 178, 23/226, 137

[56] References Cited

UNITED STATES PATENTS

| | | | |
|---|---|---|---|
| 2,177,707 | 10/1939 | Gaither | 23/130 X |
| 2,245,695 | 6/1941 | Melendy | 23/130 |
| 2,687,946 | 8/1954 | Manning et al. | 23/177 |
| 3,401,010 | 9/1968 | Guerrieri | 23/177 X |

FOREIGN PATENTS OR APPLICATIONS

| | | | |
|---|---|---|---|
| 418,255 | 10/1934 | England | 23/177 |

*Primary Examiner*—Oscar R. Vertiz
*Assistant Examiner*—Charles B. Rodman
*Attorney*—John W. Behringer, Eugene L. Bernard, Martin J. Brown, James N. Dresser, W. Brown Morton, Jr., John T. Roberts, Malcalm L. Sutterland and Morton, Bernard, Brown, Roberts & Sutterland

[57] ABSTRACT

A process for treating metal pyrosulfites such as potassium, cesium, and rubidium pyrosulfites to obtain $SO_2$ therefrom is disclosed. The pyrosulfite is reduced with a reducing agent such as hydrogen while in physical admixture with an inert, inorganic, refractory, particulate solid, a eutectic mixture of which with the desired metal sulfide has a melting point greater than the reduction zone temperatures, preferably greater than 1,650° F. Advantageously, the refractory solid for the reduction zone mixture is provided by introducing to the zone a pelletized admixture of the metal pyrosulfite with a hydrate of the refractory solid which, upon being heated to the reduction zone temperatures, will release water of hydration and be converted in situ to the refractory solid. Especially preferred is the use of pelletized admixtures of hydrous aluminum oxide and the metal pyrosulfite, the hydrous aluminum oxide being converted to alumina with the release of water when subjected to the reduction zone temperatures. The process can be employed with particular advantage where the pyrosulfite is obtained as a result of reacting $SO_2$-containing gases with an aqueous absorbing solution of the corresponding metal sulfite to produce a spent absorbing solution containing dissolved metal bisulfite, and then recovering the metal bisulfite therefrom in the form of the corresponding metal pyrosulfite (e.g., by cooling the spent absorbing solution to crystallize out the pyrosulfite). The metal sulfide product obtained can be dissolved in water and the resulting solution treated with $CO_2$ to provide hydrogen sulfide and the corresponding metal carbonate (which can be recycled to the $SO_2$ absorption reaction). The $H_2S$ from the latter step may be mixed with the $SO_2$ obtained from the reducing step and the mixture subjected to the Claus reaction to produce elemental sulfur and water.

10 Claims, No Drawings

REDUCTION OF PYROSULFITE

The present invention relates to a process for reducing metal pyrosulfite to produce $SO_2$, particularly in an $SO_2$ recovery process wherein $SO_2$ is absorbed from $SO_2$-containing gases with an aqueous solution of a metal sulfite, thereby forming an aqueous solution of the corresponding metal bisulfite (an $SO_2$ precursor), the $SO_2$ precursor then being recovered from the solution, and then being treated to produce $SO_2$ and its corresponding metal sulfite which can be used as recycle.

In accordance with the present invention, the metal pyrosulfite is treated to recover the $SO_2$ therefrom by chemical reduction of the pyrosulfite, while in physical admixture with a refractory solid, to the corresponding metal sulfide and $SO_2$.

In commonly owned U.S. application, Ser. No. 773,344 of Terrana et al., filed Nov. 4, 1968, is disclosed a method of treating metal pyrosulfites to recover $SO_2$ therefrom which involves contacting the pyrosulfite in a reduction zone at reduction temperatures with a reducing agent which is effective to remove all of the oxygen atoms from the pyrosulfite molecule, thereby reducing the pyrosulfite to the corresponding metal sulfide. As suitable such reducing agents may be mentioned carbon, carbon monoxide, hydrogen, hydrogen sulfide, and mixtures of the foregoing. In one embodiment, the resulting metal sulfide is dissolved in water and the solution reacted with $CO_2$ to form the corresponding metal carbonate and $H_2S$. Other embodiments involve the subjection of the thus formed $SO_2$ and $H_2S$ to the Claus reaction, whereby these reactants are converted to elemental sulfur and water; and incorporating the metal carbonate as makeup in the metal sulfite solution used in the $SO_2$ absorption step.

The present invention relates to an improved process over that disclosed in the Terrana et al. application, Ser. No. 773,344; more particularly it improves upon the method of recovering $SO_2$ from the pyrosulfite by chemical reduction. In particular, this invention can be advantageously integrated with the systems disclosed in commonly owned, copending applications, Ser. Nos. 616,682, filed Feb. 16, 1967, and 681,775, filed Nov. 9, 1967, of Terrana et al. and Ser. No. 681,680, filed Nov. 9, 1967, of Miller et al. These applications disclose a process for treating $SO_2$-containing gases—especially waste gases such as smelter gases, off gases from many chemical plants, and stack or furnace gases from coal-burning furnaces such as used in electric power plants—with an aqueous solution of metal sulfite, e.g., potassium, cesium, or rubidium sulfite, to absorb the $SO_2$ therefrom and form a spent absorbing solution containing the corresponding metal bisulfite. In this process, using an aqueous solution of potassium sulfite as an example but not as a limitation, the principal reaction in the $SO_2$ absorption zone proceeds as follows:

$$K_2SO_3 + H_2O + SO_2 \rightarrow 2\, KHSO_3$$

The spent solution generally contains the following ingredients:

|  | Weight Percent Range | |
| --- | --- | --- |
|  | Generally | Usually |
| Metal sulfate | 0 to 8 | 1 to 6 |
| Metal bisulfite | 5 to 40 | 10 to 30 |
| Metal sulfite | 10 to 50 | 20 to 45 |
| Water | balance | balance |

As a first step toward recovering the $SO_2$ from the spent absorbing solution the latter can be treated to recover the metal bisulfite therefrom in the form of the corresponding metal pyrosulfite. Such recovery can be accomplished, for instance, by selectively extracting the metal bisulfite from the solution or by selectively extracting the other ingredients therefrom, and, either in the same operation or as a separate step, transforming the metal bisulfite to the corresponding metal pyrosulfite. In one embodiment of the present invention, such recovery can be accomplished, for example, by crystallizing the metal bisulfite (which transforms to the metal pyrosulfite during crystallization) out of the solution. Again using potassium bisulfite as an example, the reaction proceeds as follows:

$$2\, KHSO_3 \xrightarrow{cool} K_2S_2O_5 + H_2O$$

As discussed in the above-mentioned copending applications, the resulting metal pyrosulfite, after separation from its mother liquor, which liquor usually contains significant amounts of $SO_2$ partial pressure-lowering materials such as the corresponding metal sulfite, can be thermally decomposed to evolve $SO_2$ and regenerate the metal sulfite required for the initial $SO_2$ absorption step. In the case of the potassium pyrosulfite the reaction theoretically proceeds as follows:

$$K_2S_2O_5 \xrightarrow{heat} K_2SO_3 + SO_2$$

However, in decomposing the pyrosulfite as described above, a second reaction, called "disproportionation," occurs simultaneously with the thermal decomposition of the pyrosulfite. These reactions can occur as follows: Thermal decomposition: $3K_2S_2O_5 \xrightarrow{heat} 3K_2SO_3 + 3SO_2$  Disproportionation: $3K_2SO_3 + SO_2 \rightarrow 2K_2SO_4 + K_2S_2O_3$ As can be seen, there is a total loss of metal sulfite solution for recycle to the absorber. In addition, one-third of the relatively pure $SO_2$ product, a valuable product, is lost through the disproportionation reaction.

By employment of the chemical reduction process of the present invention to convert the pyrosulfite to the corresponding metal sulfide and $SO_2$, a substantial improvement over the above, thermal decomposition method is realized. A savings in energy requirements, for instance, is obtained. In addition, when subjecting the metal sulfide to reaction with $CO_2$ and water to produce the corresponding metal carbonate and hydrogen sulfide, in one embodiment of the present invention, there can be obtained two moles of sulfur from each mole of the pyrosulfite, as compared to a theoretical yield of approximately 0.66 mole obtained by the above described thermal decomposition of the pyrosulfite. (Actual laboratory yields are about 0.33 mole.)

As indicated above, the process of the present invention for treating the metal pyrosulfite to recover $SO_2$ therefrom involves contacting the metal pyrosulfite, while in physical admixture with a refractory solid, with a reducing agent such as carbon, carbon monoxide, hydrogen, hydrogen sulfide, or mixtures thereof, at a temperature sufficient to reduce the pyrosulfite to the corresponding metal sulfide and $SO_2$, e.g., in the range of about 1,200° to 1,800° F. The overall equation for the reduction of the metal pyrosulfite with each of the aforementioned reducing agents proceeds as follows, potassium pyrosulfite with each of the aforementioned reducing agents proceeds as follows, potassium pyrosulfite being used for illustrative purposes:

$$3K_2S_2O_5 + 6C \xrightarrow{heat} 3K_2S + 2SO_2 + S + 5CO_2 + CO$$
$$3K_2S_2O_5 + 11CO \xrightarrow{heat} 3K_2S + 2SO_2 + S + 11CO_2$$
$$3K_2S_2O_5 + 12H_2 \xrightarrow{heat} 3K_2S + 2SO_2 + H_2S + 11H_2O$$
$$K_2S_2O_5 + 3H_2S \xrightarrow{heat} K_2S + SO_2 + 3S + 3H_2O$$

In the reduction of the metal pyrosulfite a series of reactions is believed to occur; in the case of potassium pyrosulfite and carbon, for example, they can be illustrated as follows:

$$3K_2S_2O_5 \rightarrow 3K_2SO_3 + 3SO_2$$
$$3K_2SO_3 + SO_2 \rightarrow 2K_2SO_4 + K_2S_2O_3$$
$$2K_2SO_4 + K_2S_2O_3 + 6C \rightarrow 3K_2S + S + 5\,CO_2 + CO$$

Summation of these reactions gives the overall equation set forth above.

One problem which can exist in the above reduction processes, and which the present invention seeks to resolve, is that at the temperatures required in the reduction zone the metal sulfide product will often be formed in a molten state. Potassium sulfide, for example, melts at about 1,250° F. Accordingly, removal of the molten product from the reduction zone becomes difficult due to its propensity for fusing into a hard mass when it encounters lower temperature regions of the apparatus in the course of being discharged from the reduction zone. Also, in its molten state the product is extremely corrosive, even attacking porcelain, and it is therefore difficult to find a material that will withstand its attack. This material is not, however, corrosive in its solid state. The problem generally occurs when a gaseous reducing agent is employed. When a solid reducing agent, such as coal, is used, the production of a molten product can usually be avoided by employing a large excess over stoichiometric, say at least about 5 times the amount stoichiometrically required, of the solid reducing agent. Still, the process of the present invention can be employed with solid as well as gaseous reducing agents, although its advantage lies primarily in its use with gaseous reducing agents.

It has now been found that the above problems can be obviated by employing in the reduction zone a physical admixture of the metal pyrosulfite with an inert, inorganic, refractory, particulate solid, a eutectic mixture of which with the desired metal sulfide has a melting point greater than the reduction zone temperatures, preferably greater than 1,650° F. By "inert" is meant herein and in the claims that the refractory solid is nondeleterious, that is, will not react with either the metal pyrosulfite, the reducing agent, the $SO_2$, or the metal sulfide at the reduction zone temperatures in such a manner as to defeat the intended purpose of the reduction reaction. The refractory solid is in particulate form and preferably the particles thereof will be of suitable size to form uniform mixtures with the metal pyrosulfite, say in the range of about 10 to 200, often about 40 to 100, mesh (U.S. Sieve), which are frequently also the particle sizes of the pyrosulfite to be used. As stated above, the refractory solid is one which, were it blended in a eutectic mixture with the metal sulfide to be produced by the reduction reaction, would provide such a eutectic mixture with a melting point greater than the temperature to be employed in the reduction zone, preferably greater than 1,650° F. Preferably, the refractory solid is one which increases or enhances the effective surface area of the metal pyrosulfite by being uniformly admixed therewith. Suitable refractory solids for use in the method of the present invention include, for example, refractory metal oxides, including mixtures thereof, such as alumina, silica, and fly ash.

A preferred manner of providing the refractory solid-pyrosulfite admixture in the reduction zone, especially where a gaseous reducing agent is employed, is by introducing to the zone an admixture (preferably pelletized) of the metal pyrosulfite and an inorganic hydrate which is a precursor for the refractory solid, i.e., an inorganic hydrate which, when subjected to the reduction zone temperatures, will release its water of hydration and thereby be converted to the refractory solid. By such a manner, the refractory solid is produced in situ, as it were, in the reduction zone. The release of the water of hydration from the precursor causes pellets in which the precursor is present to be perforated, thereby increasing the effective surface area of the pyrosulfite, thus facilitating the access of gaseous reducing agent to the metal pyrosulfite and allowing for a more complete reaction.

A particularly suitable inorganic hydrate is hydrous aluminum oxide. Upon being heated to the reduction zone temperatures, hydrous aluminum oxide releases its water of hydration and is thereby converted to alumina, which is an ideal refractory solid for use in the process of the present invention. While, as indicated above, the use of such a precursor as the source of the refractory solid is especially advantageous where the precursor is introduced in pelletized admixture with the pyrosulfite, it is to be understood that, if desired, it can be employed in nonpelletized admixtures as well.

The presence of the refractory solid during the reduction reaction inhibits, or altogether prevents, molten masses of the metal sulfide product from forming, even, for example, at temperatures as high as about 1,650° F. or higher. The product obtained from the reduction reaction — that is, the nongaseous product — is usually in the form of porous pellets or as a particulate solid of sandlike characteristics. As such, it is more easily removed from the reduction zone than is a molten product having a high fusion point. Moreover, because of the avoidance of liquid encapsulation of the reactants in the reduction zone, more complete reduction of the reducible substances in the reaction mixture can be obtained in generally shorter times than are required without the presence of the refractory solid. In addition, by remaining in the solid state the corrosion problem mentioned above is substantially lessened.

Contacting temperatures in the reduction zone are preferably about 1,250° to 1,650° F., most preferably at least about 1,400° or even 1,560° F. Atmospheric, as well as sub and superatmospheric, pressures can be employed in the reduction zone. Ambient pressure conditions are preferred, however, for economic reasons. Suitable residence times for the pyrosulfite in the reduction zone will vary with different reactants, temperatures, etc., but good reduction is often obtained with a residence time of at least about 30 minutes, and some improvement is frequently noted when extending the time to 45 minutes. These observations are particularly true when employing reduction zone temperatures of about 1,560° F. or higher.

The metal pyrosulfite employed in the reduction step is usually fairly crude when it is obtained from a waste gas absorbing operation; for instance, it will frequently contain significant amounts of the corresponding metal sulfite and sulfate, the latter often being produced by reaction of $SO_3$ in the gases with the metal sulfite of the absorbing solution. This has been indicated in the earlier discussion herein of the general constituency of a spent $SO_2$ absorbing solution. In addition, there may be formed in situ in the reduction zone minor amounts of sulfates, thiosulfates, trithionates, tetrathionates, and pentathionates. An advantageous feature of the present invention is that the presence of such impurities is generally not detrimental to the process of the invention since, as indicated above, they are reduced to the corresponding metal sulfide in the reduction step.

According to the method of the present invention, the metal pyrosulfite is subjected to the reduction reaction while in physical admixture with, generally, about 0.05 to 1, or even more, parts by weight of the refractory solid per part by weight of the metal pyrosulfite. Preferably, there will be employed at least about 0.12, and most preferably at least about 0.25, part of the refractory solid per part of the pyrosulfite.

Where there is employed a mixture, preferably pelletized, of the metal pyrosulfite and a water of hydration-containing precursor of the refractory solid, then it is usually preferred that the mixture, prior to being heated to the reduction zone temperatures, have a total water content of about 1 to 14, most preferably about 6 to 8, weight percent. By total water content is meant to include uncombined water as well as water of hydration.

By the term "hydrous aluminum oxide" is meant herein and in the claims an aluminum compound containing combined water of hydration and which, upon heating to the reduction zone temperatures, will release water of hydration and be converted to aluminum oxide in any of its various forms. As the hydrous aluminum oxide component, then, there can be employed, for example, amorphous hydrous alumina as well as the crystalline hydrous aluminas. As examples of the latter may be mentioned, for instance, aluminum oxide monohydrate (also sometimes known as Boehmite) and the various forms of aluminum oxide trihydrate, e.g., bayerite and gibbsite. Also suitable, and included within the term "hydrous aluminum oxide," are those compounds sometimes denominated as aluminum hydroxides which, upon heating to the reduction zone temperatures, also release water of hydration and are transformed into aluminum oxide. Illustrative of suitable hydrous aluminum oxides for use in the process of the present invention, then, are those aluminum compounds corresponding to the following chemical formulas:

AlO(OH)
Al(OH)$_3$
{Al(OH)$_3$(H$_2$O)$_3$}
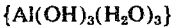
Al$_2$O$_3$·H$_2$O
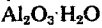
Al$_2$O$_3$·3H$_2$O
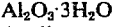

As discussed above, the mixture of the inorganic hydrate, e.g., hydrous aluminum oxide, and the metal pyrosulfite, where such is used, is preferably pelletized. By "pelletized" is meant, herein and in the claims, formed into larger pieces, each piece, however, being itself composed of the aforedescribed mixture. The resultant larger, or macrosize, pieces may be denominated briquettes, tablets, pellets, or whatever. Any suitable means for pelletizing the mixture may be employed; extrusion or tabletting techniques, for instance, are quite suitable. If desired, for example where the pellets are prepared by extrusion or tabletting, conventional dye lubricants can be included in the composition. Also, the water content of the mixture can be adjusted to facilitate the pelletization. Also, where carbon is employed as reducing agent, it may also be included in the pelletized mixture, for instance in a weight ratio of about 2 to 1, preferably about 0.5 to 1, parts of carbon per part of the metal pyrosulfite. Generally, a particle size of about 10 to 200 mesh, preferably about 40 to 100 mesh, for the carbon can be used.

The bulk density of the pelletized admixture of the metal pyrosulfite and the inorganic hydrate, where such is used, will generally be about 1.2 to 2.2, preferably about 1.5 to 1.9, grams per cubic centimeter. Often preferred are pellets having a longest dimension of about 1 to 2, preferably about 1.3 to 1.7, inches, and a shortest dimension of about 0.8 to 1.4, preferably about 1 to 1.2, inches.

The amount of reducing agent employed in the reduction reaction should be at least that amount stoichiometrically required to reduce all of the reducible metal salts present in the reduction zone to the corresponding metal sulfide, and preferably at least about a 10% excess over stoichiometric will be used. As indicated above, the process of the present invention, while operable with solid reducing agents such as carbon, can be employed with special advantage where the reducing agent employed, when heated to the reduction zone temperatures, exist therein in the gaseous state, as, for example, carbon monoxide, hydrogen, or hydrogen sulfide. Any suitable source of carbon, carbon monoxide, hydrogen, or hydrogen sulfide can be employed as the reducing agent. An industrial gas containing mixtures of two or more of the foregoing is preferred for economic reasons. Thus, for example, gaseous mixtures containing hydrogen and carbon monoxide, such as reformer gas and water gas, are often preferred. A typical analysis of a suitable reformer gas, for instance, is as follows:

Reformer Gas Composition

| Component | Mol Percent |
| --- | --- |
| Water | 56.52 |
| Hydrogen | 32.98 |
| Carbon dioxide | 5.88 |
| Carbon monoxide | 3.48 |
| Methane | 1.14 |

A suitable source of $H_2S$, should it be employed as the reducing agent, when using one embodiment of the present invention, is the overhead gas stream evolving from the reaction of the metal sulfide with water and carbon dioxide, hereinafter discussed in more detail.

Any suitable source of carbon may be employed, e.g., coal, charcoal, and hydrocarbons which will decompose at the reduction zone temperatures to produce carbon in situ, for instance petroleum pitch. Hydrogen will also be produced when employing coking-type hydrocarbons as an in situ source of carbon, and both reducing agents will enter into the reaction to reduce the pyrosulfite to the sulfide. The preferred carbon source, for economic reasons, is coal, e.g., bunker coal. It is preferred to coke the coal to remove volatiles prior to admixing it with the pyrosulfite. Coking can be accomplished, for example, by heating to about 1,200° to 1,400° F. for, say, at least about 10 minutes.

Any suitable mode of contacting the pyrosulfite-refractory solid mixture with the reducing agent which provides for intimate admixing of the reactants can be employed. It is often preferred, when using a gaseous reducing agent, to bring the reactants in countercurrent contact with one another. Thus, for instance, the admixture of the pyrosulfite and the refractory solid (or its precursor, e.g., in pelletized form) can be introduced at the top of a shaft furnace and allowed to travel downwardly therein through upwardly flowing reducing gas which is introduced in the bottom of the furnace. $SO_2$-containing product gas is then removed as overhead from the furnace and product solids containing the refractory solid and metal sulfide are recovered as bottoms.

The inclusion of hydrous aluminum oxide in the reaction mixture according to the above discussed preferred method of the present invention has been found to result in the conversion of at least a portion of the hydrous aluminum oxide to an aluminate of the metal of the pyrosulfite. This metal aluminate is recovered from the reduction zone as a component of the solid reaction product, i.e., in admixture with the metal sulfide and the alumina. The metal aluminate can be converted back to hydrous aluminum oxide in the same treatment in which the metal sulfide is, in the preferred after-treatment step discussed below, converted to hydrogen sulfide and the corresponding metal carbonate.

As a preferred feature of the present invention, the metal sulfide-containing solid product obtained from the reduction zone is recovered, dissolved in water, and the resultant metal sulfide solution reacted with carbon dioxide to produce the corresponding metal carbonate and hydrogen sulfide. Where the reducing agent employed in the preceding conversion of the pyrosulfite to the sulfide is carbonaceous, e.g., carbon or carbon monoxide, a suitable source of the $CO_2$ for this reaction may be the off gases from the reduction zones after the $SO_2$ and the sulfur have been removed therefrom. Another suitable source of the $CO_2$ is a $CO_2$-containing gas, e.g., a waste gas such as flue gas, which has been treated with a metal sulfite solution in the manner described above to absorb $SO_2$ therefrom. Also, of course, a completely external source of $CO_2$ can be employed.

The $CO_2$ treatment is conducted at a temperature sufficient to convert the metal sulfide to the corresponding metal carbonate. Generally, the temperature will range from about 100° to 225° F., and preferred contacting temperatures are from about 140° to 180° F. Advantageously, the sulfide solution and the $CO_2$ are countercurrently contacted with one another, for example in a vertical column-type reactor wherein the sulfide solution is introduced at the top of the reactor and proceeds downwardly over a series of trays in countercurrent flow with gaseous $CO_2$ which is introduced at the bottom of the reactor.

Preferably, at least the stoichiometric amount of $CO_2$ required to convert all of the metal sulfide and the metal aluminate, if any, which is present in the aqueous solution of the reduction product solids is employed. Advantageously, at least about a 10 percent excess of $CO_2$ is employed. The reaction proceeds without the presence of catalyst. Atmospheric, sub, or superatmospheric pressures may be used; for economic reasons, however, ambient pressure conditions are preferred. Using potassium sulfide for illustrative purposes, the conversion of the metal sulfide to the corresponding metal carbonate and $H_2S$ proceeds as follows:

$$K_2S + H_2O + CO_2 \rightarrow K_2CO_3 + H_2S$$

Generally, sufficient water should be admixed with the solid product from the reduction zone to dissolve substantially all of the metal sulfide which is present therein. This will often range from about 2 to about 4 parts of water per part by weight of the solid product. A portion of the solid reaction product mixture will be the refractory solid, which will remain undissolved in the water. If desired, the resultant slurry can be filtered to remove this refractory solid as well as any other insoluble material present therein. These solids can then be removed from the system or recycled to the process. Where, for example, the refractory solid employed is alumina, either added to the reduction zone as such or made in situ, then the recovered alumina can, if desired, be recycled to the pyrosulfite-refractory solid mixing step of the process, or it can be activated by calcination and used as the catalyst in the reacting of $SO_2$ and $H_2S$ to produce elemental sulfur and water, which reaction, as mentioned above, is conducted in a preferred embodiment of the invention.

When the refractory solid is supplied to the process by introducing hydrous aluminum oxide to the reduction zone and the solid product mixture contains metal aluminate as a consequence, then aqueous dissolution of the product mixture causes at least a portion of the metal aluminate to be converted back to hydrous aluminum oxide and the corresponding metal hydroxide according to the following reversible reaction, potassium again being used for illustrative purposes:

$$K_2Al_2O_4 \cdot 3H_2O \rightleftharpoons 2\{Al(OH)_3(H_2O)_3\} + 2KOH$$

The subsequent treatment of the resultant solution with carbon dioxide, however, forces the above reaction to the right by forming potassium carbonate and a precipitate of the hydrous aluminum oxide according to the reaction:

$$K_2Al_2O_4 \cdot 3H_2O + 3H_2O + CO_2 \rightarrow 2\{Al(OH)_3(H_2O)_3\} + K_2CO_3$$

Thus, it is seen that the $CO_2$ treatment of the aqueous solution of the mixed metal sulfide and metal aluminate product from the reduction zone results in the release of gaseous $H_2S$ and the formation of a slurry of hydrous aluminum oxide in an aqueous metal carbonate solution. Where, then, water-soluble metal aluminate is present in the solid reduction product, there is preferably employed, in the above-discussed embodiment of the present invention, sufficient water to dissolve substantially all of the metal aluminate as well as the metal sulfide.

In a further embodiment of the present invention, the $H_2S$ produced by the reaction of the metal sulfide with water and $CO_2$ is reacted with the $SO_2$ produced by the reduction of the metal pyrosulfite according to the Claus reaction to yield elemental sulfur and water:

$$2 H_2S + SO_2 \underset{heat}{\rightarrow} 3S + 2H_2O$$

The Claus reaction is advantageously conducted in the presence of water or in the presence of activated alumina as catalyst. Thus, the $H_2S$ and $SO_2$ can be continuously introduced in gaseous state to a reaction vessel filled with water which is maintained at the desired reaction temperature, e.g., about 80° to 200° F., and a slurry of precipitated elemental sulfur in water continuously removed from the bottom of the vessel. Filtration of the slurry yields crystalline sulfur of excellent purity.

When employing activated alumina to catalyze the Claus reaction, the gaseous $H_2S$ and $SO_2$ can advantageously be passed through a fixed bed reactor loaded with the activated alumina at a temperature of about 450° to 700° F., preferably about 500° to 600° F. The contacting of the reactants with the catalyst can generally be at a weight hourly space velocity (WHSV) of about 0.1 to 10.

$H_2S$ is highly toxic and it is a particularly undesirable chemical to release to the atmosphere. Accordingly, it is preferred in the process of the present invention that essentially all of the $H_2S$ produced during the conversion of the metal sulfide to the metal carbonate can be oxidized to elemental sulfur in the Claus reaction. The $H_2S$ should be reacted with $SO_2$ in as nearly stoichiometric amounts as can practicably be provided. If the supply of $SO_2$ is for some reason inadequate, i.e., less than one-half mole per mole of $H_2S$ available, a portion of the excess $H_2S$ can be oxidized in air, for example at about 1,000 to 1,200° F., to produce additional $SO_2$ and water according to the reaction:

$$2H_2S + 3O_2 \underset{heat}{\rightarrow} 2SO_2 + 2H_2O$$

As indicated earlier, the metal carbonate produced in the optional preferred step of reacting the metal sulfide with water and $CO_2$ is advantageously recycled to the $SO_2$ absorption step. It can, for example, be added to the fresh absorbing solution entering the $SO_2$ absorption zone at the head of the process. The dissolved metal carbonate reacts with the $SO_2$ in the $SO_2$-containing gases to produce the corresponding metal sulfite, which in turn reacts with water and another mole of $SO_2$ to yield the corresponding metal bisulfite. Using potassium carbonate for illustrative purposes, the following reactions are involved:

$$K_2CO_3 + SO_2 \rightarrow K_2SO_3 + CO_2$$
$$K_2SO_3 + H_2O + SO_2 \rightarrow 2 KHSO_3$$

Where, in accordance with a preferred embodiment of the process discussed above, there is also present in the aqueous solution of the metal sulfide, dissolved metal aluminate, then the hydrous aluminum oxide which is precipitated therefrom as a result of the $CO_2$ treatment can be recovered by known methods, such as filtration, decantation and centrifugation, prior to recycling the metal carbonate to the process. The recovered hydrous aluminum oxide can advantageously be recycled to the reduction zone, after first being admixed, and preferably pelletized, with fresh metal pyrosulfite. If desired, the hydrous aluminum oxide can first be dried, say at about 200° to 300° F., to remove excess water prior to being subjected to the admixing and pelletizing operations.

The following examples will serve to better illustrate the invention.

EXAMPLE I

Flue gas from a coal-burning furnace, and having the following approximate composition, is sent to an $SO_2$ absorber column:

| | | |
|---|---|---|
| Sulfur dioxide | 0.3 | mole % |
| Oxygen: | 3.4 | mole % |
| Water vapor: | 6.0 | mole % |
| Carbon dioxide: | 14.2 | mole % |
| Nitrogen | 76.1 | mole % |
| Sulfur trioxide: | 0.0003 | mole % |
| Fly ash: | 0.3 grain per cubic foot | |

The flue gas is introduced to the absorber column at a temperature of about 300° F. and a flow rate of about 2010 actual cubic feet per minute (ACFM).

Before entering the chemical absorption zone of the column, the flue gas is conducted through a scrubbing zone in the column wherein the gas is scrubbed with 0.1 gallon per minute (GPM) of water to first remove other contaminants such as entrained particulate solid components, e.g., the fly ash, and the more water-soluble components than the $SO_2$, e.g., the $SO_3$. Spent scrubbing water containing the removed fly ash and $SO_3$ is separated from the scrubbed gas and removed from the column. The scrubbed gas exits the scrubbing zone substantially free of the contaminants and passes into the absorption zone at a temperature of about 255° F. and a humidity of about 8 mole percent, the increased water content having been acquired in the scrubbing operation.

In the absorption zone of the column the scrubbed gas is countercurrently contacted with an aqueous absorbing solution of potassium sulfite which enters the column at about 150° F. and at a feed rate of about 68 pounds per minute. The entering absorbing solution has the following approximate composition:

| | |
|---|---|
| $KHSO_3$ (calculated as $K_2S_2O_5$): | 19.3 wt.% |
| $K_2SO_3$: | 26.6 wt.% |
| $K_2SO_4$: | 2.6 wt.% |
| $H_2O$: | 51.5 wt.% |

The temperatures of the scrubbed flue gas and of the entering potassium sulfite solution are high enough to maintain within the absorption zone a temperature sufficient to react the $SO_2$ in the scrubbed gas with the potassium sulfite in the absorbing solution to produce additional potassium bisulfite. Also, the flue gas vaporizes a portion of the water from the aqueous absorbing solution to provide a relative humidity of about 70 percent for the flue gas exiting the absorbing column for release to the atmosphere. The absorption zone temperature is not, however, kept so high as to cause the potassium bisulfite in the absorbing solution to decompose.

The flue gas is removed from the absorption zone and conducted to a third zone of the column, a demisting zone, wherein it is finally scrubbed with a portion of the potassium sulfite absorbing solution in an amount sufficient to remove entrained droplets and at least a portion of the absorbing solution used to demist the gas is, together with the material entrained therein and the $SO_2$ absorbed thereby, conducted to the absorption zone wherein it is combined with the absorbing solution employed therein.

A major portion e.g., about 90 percent of the $SO_2$ is removed, or stripped, from the scrubbed flue gas during its passage through the absorption and demisting zones. A spent absorbing solution is removed from the absorption zone at a temperature of about 135° F. It has the following approximate composition:

| $KHSO_3$ (calculated as | | |
|---|---|---|
| | $K_2S_2O_5$): | 23.7 wt.% |
| | $K_2SO_3$: | 26.1 wt.% |
| | $K_2SO_4$: | 2.7 wt.% |
| | $H_2O$: | 47.5 wt.% |

The pH of this spent absorbing solution is controlled to between about 6.6 and 7.4 and the solution is then conducted to a closed vessel, serving as a crystallization zone, maintained at a pressure of about 0.5 to 4 p.s.i.a. (e.g., 1 p.s.i.a.) to vaporize sufficient water from the solution to supersaturate the solution and crystallize potassium bisulfite out of the solution in the form of potassium pyrosulfite. The total amount of water evaporated from the absorbing solution in the absorption and crystallization zones is at least about equal to the amount added to the system in the scrubbing zone. The resultant slurry is removed from the crystallization zone at a temperature of about 104° F. and conducted to a filter drum to remove the potassium pyrosulfite crystals. The $SO_2$ partial pressure-lowering potassium salts, e.g., the potassium sulfite and potassium sulfate, remain in solution in the filtrate, which is recycled to the absorption zone. The resultant potassium pyrosulfite crystals are of about 25 to 100 mesh particle size and contain about 7 weight percent water. They are conducted to a screw conveyor wherein they are admixed under ambient conditions with bayerite (an aluminum oxide trihydrate) having a particle size of about 50 to 200 mesh. The pyrosulfite and bayerite are admixed in a weight ratio of about 0.25 part of bayerite (calculated as $Al_2O_3$) per part of the pyrosulfite. The total water content of the admixture is adjusted to about 7 weight percent and the resultant admixture is then sent to a pelletizing machine wherein it is extruded into 1 inch by 1 1/2 inch pellets.

The resultant pellets are conducted at a temperature of about 120° F. to the top of a shaft furnace at a rate of about 9,000 lbs. per hour. Reformer gas is introduced to the bottom of the furnace at a temperature of about 1,550° F. and a feed rate of about 144 moles (of hydrogen) per hour. The pellets and the reformer gas are countercurrently contacted in the furnace at temperatures in the range of about 1,500° to 1,550° F. and a pressure of about 15 to 20 p.s.i.a. The average residence time for the pyrosulfite in the furnace is about 40 minutes. Product $SO_2$ vapors are recovered from the furnace in the overhead gas stream and a sandy, solid product mixture is recovered as bottoms.

The solid product mixture is conducted to a mixing vessel wherein it is slurried under ambient conditions with about 2 parts of water per part by weight of solids. The resultant slurry is filtered and the filtrate recovered. The alumina-rich filter cake is recycled to the screw conveyor to be incorporated in the bayerite-pyrosulfite mixture.

The filtrate is conducted at a feed rate of about 25,200 lbs. per hour to the top of a countercurrent, gas-liquid contacting tower to which carbon dioxide is admitted at the bottom at a feed rate of about 50 moles per hour. Reactant temperatures in the tower are maintained at about 100° to 225° F. under a pressure of about 15 to 25 p.s.i.a. Hydrogen sulfide product vapors are removed from the column at a rate of about 50 moles per hour in the gaseous overhead stream and a product slurry is removed as bottoms. The product slurry is filtered to obtain a filter cake of hydrous aluminum oxide and a filtrate composed of potassium carbonate in aqueous solution. The filter cake is conducted to the screw conveyor where it is incorporated in the alumina-pyrosulfite mixture, and the filtrate is conducted to the stream of aqueous potassium sulfite solution entering the $SO_2$ absorber column.

The $H_2S$-containing overhead stream from the gas-liquid contacting tower is combined with the $SO_2$-containing stream from the furnace overhead, and the resultant mixed stream is conducted to a fixed bed reactor containing activated alumina at a temperature of about 550° F. The combined feed is passed through the catalyst bed at a rate of about one cubic foot per second, per cubic foot of catalyst. The product gases exiting the reactor contain water vapor and vaporized elemental sulfur. The sulfur is recovered therefrom in molten form by cooling in a condenser to about 400° F.

EXAMPLE II

Employing the procedure of Example I, an aqueous solution of cesium sulfite is used to absorb $SO_2$ from flue gas, providing a spent absorbing solution of cesium bisulfite, which is then recovered from the spent absorbing solution in the form of cesium pyrosulfite. The cesium pyrosulfite is admixed with bayerite and the admixture pelletized and reduced with reformer gas as in Example I.

EXAMPLE III

Employing the procedure of Example I, an aqueous solution of rubidium sulfite is used to absorb $SO_2$ from flue gas, providing a spent absorbing solution of rubidium bisulfite, which is then recovered from the spent absorbing solution in the form of rubidium pyrosulfite. The rubidium pyrosulfite is admixed with bayerite and the admixture pelletized and reduced with reformer gas as in Example I.

EXAMPLE IV

Various reactant mixtures were subjected to reduction in a porcelain boat positioned in a closed "Vycor" tube. Gaseous reducing agent, with or without a carrier gas, was introduced to the tube and product vapors were removed therefrom and passed sequentially through a condensation flask (to remove water and elemental sulfur), then through about 100 ml. of a first aqueous solution of about 2 grams of sodium bicarbonate, then through about 100 ml. of a second aqueous solution of about 2 grams of sodium hydroxide, and were then exhausted to a laboratory hood. The sodium bicarbonate solution absorbed $SO_2$ present in the vapors, allowing $H_2S$ to pass through and be absorbed in the sodium hydroxide solution.

After completion of the reduction, aliquot portions of the two solutions were titrated with standard iodine solution, the sodium hydroxide solution portion first being well buffered with sodium bicarbonate. The iodine titration data are reported in Table I as the milliliters of a 1 Normal iodine solution that would be required to titrate the entire solution. The higher the iodine number of the bicarbonate solution, the greater the amount of $SO_2$ absorbed by that solution. As regards the sodium hydroxide solution, the higher iodine number for that solution indicates the greater the amount of $H_2S$ in the product vapors from the reduction.

The solid product remaining in the porcelain boat after completion of the reduction was divided into two portions. To one portion was added an excess of 0.1N HCl, the resultant slurry filtered, and the filtrate boiled to almost dryness. The residue remaining from boiling off the HCl was dissolved in water and to the resultant solution was added aqueous barium chloride solution to precipitate out the sulfate ions present therein in the form of barium sulfate. The resultant slurry was digested and then filtered. The filter cake was washed with water, placed in a porcelain crucible and ignited therein in a muffle furnace. The weight of the barium sulfate residue after the ignition was then determined. From the weight thereof was calculated the percent of potassium sulfate in the solid product from the reduction, based on the weight of potassium pyrosulfite present in the reactant mixture.

To the remaining portion of the solid product from the reduction was added sufficient water to obtain 200 ml. of mixture. The resultant mixture was allowed to settle and the aqueous solution was decanted. An aliquot portion of the solution was well buffered with sodium bicarbonate and then titrated with standard iodine solution (0.15 N) to determine the amount of oxidizable solute therein. (Potassium sulfide is oxidized by iodine, whereas potassium sulfate is not.) From the titration data was calculated the iodine number of the liquid; it is reported in Table I as the milliliters of a 1 N iodine solution which would be required to titrate the entire solution. Thus, the higher iodine number indicates the more complete conversion of the potassium pyrosulfite to potassium sulfide as a result of the heating.

evolution of $SO_2$ was measured and found to be 23 percent and 24 percent. To prevent the loss of sulfur values, then, such mixing, if done outside the reduction zone, should preferably be conducted in equipment which allows for the recovery of the off gases emitted during the mixing.

EXAMPLE V

Employing the procedure of Example IV, potassium pyrosulfite was reduced with hydrogen gas which had been nearly saturated with water vapor. The pyrosulfite was in pelletized admixture with hydrous aluminum oxide. Various pyrosulfite-to-aluminum oxide ratios and various reaction conditions were employed. Results of the reductions are re-

TABLE I

| Run No. | Reaction mixture components, grams | | | | Reaction mixture form [1] | Carrier and/or reducing gases [4] | Temp., °F. | Time, min. | Iodine number | | | $K_2SO_4$, wt. percent |
|---|---|---|---|---|---|---|---|---|---|---|---|---|
| | $K_2S_2O_5$ | Al(OH)$_3$ | | Carbon | | | | | $NaHCO_3$ soln. | NaOH soln. | Product soln. | |
| | | As gel [2] | As solid [3] | | | | | | | | | |
| 1 | 10 | | | | P | $H_2$ | 1,200 | 30 | 56 | 8 | 60 | 55 |
| 2 | 1.1 | 6.8 | | | S | $H_2$ | 1,200 | 10 | 47 | 20 | 6 | 62 |
| 3 | 3.3 | 3.3 | 3.3 | | S | $H_2+CO_2$ | 1,200 | 30 | 38 | 16 | 1.5 | 59 |
| 4 | 3.3 | 3.3 | 3.3 | | S | $H_2+O_2$ | 1,380 | 30 | 33 | 51 | 16 | 24 |
| 5 | 3.3 | 3.3 | 3.3 | | S | $H_2+CO_2$ | 1,470 | 30 | 35 | 30 | 30 | 9 |
| 6 | 3.3 | 3.3 | 3.3 | | S | $H_2+CO_2$ | 1,560 | 30 | 44 | 56 | 40 | 2 |
| 7 | 2 | 2 | 2 | 2 | S | $CO_2$ | 1,470 | 30 | 35 | 18 | 19 | 27 |
| 8 | 3.4 | 0.84 | 3.4 | | B | $H_2+CO_2$ | 1,560 | 32 | 45 | 43 | 31 | 2 |
| 9 | 3.8 | 0.94 | 3.8 | 1.9 | B | $CO_2$ | 1,560 | 30 | 45 | 14 | 34 | 13 |
| 10 | 3.2 | 1.4 | 3 | 1.6 | B | $CO_2$ | 1,560 | 60 | 31 | 17 | 37 | 14 |
| 11 | 4.3 | [5]1 | [6]4.3 | | B | $H_2+CO_2$ | 1,560 | 30 | 44 | 29 | 30 | 3 |
| 12 | 8.7 | [5]1.9 | 8.7 | | B | $H_2+CO_2$ | 1,560 | 30 | 29 | 24 | 67 | 2 |
| 13 | 16.9 | 3.8 | 16.9 | | B | $H_2+CO_2$ | 1,560 | 30 | 26 | 21 | 35 | 8 |

[1] P=powder; S=slurried in the gel; B=briquet.
[2] Weight of aqueous gel containing 5 wt. percent of the hydrous aluminum oxide.
[3] Dried at 110° C.
[4] In Runs 10–13 the carrier gas and reducing gas (where present) were nearly saturated with water.
[5] Recycled gel.
[6] Recycled solid Al(OH)$_3$.

Several observations can be made from the data in the foregoing table. Some of these, plus additional information regarding certain of the runs, are as follows:

In Run 10 there was employed insufficient carbon to reduce all of the potassium pyrosulfite. This was so because a portion of the carbon reacted with the $CO_2$ carrier gas.

The aqueous solutions of the solid products obtained from using hydrogen as the reducing gas were generally much lighter in color than were those obtained when using carbon, carbon monoxide, or hydrogen sulfide. The product solutions obtained with the latter three reducing agents were always bright yellow in color.

Runs 4, 5 and 6 demonstrate the progressively improved effect of increasing the reduction zone temperature from 1,380° to 1,470° to 1,560° F.

In Run 12 it was found that about 28 percent of the potassium submitted to the reduction was converted to potassium aluminate, and about 72 percent was converted to potassium sulfide.

ported in Table II as the amounts of potassium sulfate, potassium sulfide, $H_2S$, and $SO_2$ produced and the molar ratio of $H_2S$ to $SO_2$ produced. There is also reported the amount of potassium sulfate present in the pellets prior to their being subjected to the reduction zone temperatures. The potassium pyrosulfite before being admixed and pelletized with the aluminum oxide contained about 2 weight percent potassium sulfate. In each run the admixing and pelletizing effected an increase in this sulfate content, as was observed to be the case in Example IV.

It is claimed:

1. In a process of reducing a metal pyrosulfite selected from the group consisting of potassium pyrosulfite, cesium pyrosulfite, and rubidium pyrosulfite to the corresponding metal sulfide and $SO_2$ by contacting the metal pyrosulfite in a reduction zone at reduction temperatures in the range of about 1,250 to 1,650° F. with a reducing agent selected from the group consisting of carbon, carbon monoxide, hydrogen, hydrogen sulfide, and mixtures of the foregoing, the improve-

TABLE II

| Run No. | Weight ratio $K_2S_2O_5$/ Al(OH)$_3$ | Reaction conditions [1] | Weight (gms.) of potas. pyrosulfite | $K_2SO_4$ content (gms.) before run [2] | Products (gms.) [2] | | | | Mole ratio $H_2S/SO_2$ |
|---|---|---|---|---|---|---|---|---|---|
| | | | | | $K_2SO_4$ | $K_2S$ | $H_2S$ | $SO_2$ | |
| 14 | 1/2 | A | 13.8 | 4.2 | 3.3 | 0.1 | 0.42 | 1.1 | .67 |
| 15 | 1/1 | A | 8.9 | 5.7 | 7.1 | 0.8 | 0.48 | 1.4 | .62 |
| 16 | 5/3 | A | 7.6 | 2.2 | 2.4 | 1.8 | 0.44 | 1.2 | .72 |
| 17 | 3/1 | A | 7.4 | 1.9 | 6.4 | 1.3 | 0.25 | 0.86 | .37 |
| 18 | 4/1 | A | 6.5 | 2.5 | Nil | 4.5 | 0.42 | 1.1 | 0.70 |
| 19 | 5/1 | A | 5.2 | 3.1 | 0.46 | 4.4 | 0.26 | 1.1 | 0.45 |
| 20 | 2/1 | B | 7.8 | 4.3 | 1.46 | 3.6 | 0.02 | 0.9 | 0.40 |
| 21 | 4/1 | B | 7.1 | 2.3 | 5.1 | 2.3 | .11 | 1.1 | .18 |
| 22 | 5/1 | B | 5.5 | 2.7 | 2.2 | 3.4 | .28 | 1.1 | .65 |
| 23 | 4/1 | C | 7.6 | 2.4 | 1.01 | 3.5 | .24 | 0.91 | .46 |

[1] Reaction conditions: A=1,470° F., 2 hours. B=1,560° F., 30 minutes. C=1,560° F., 40 minutes.
[2] Weights adjusted to basis of 10 grams of potassium pyrosulfite prior to admixing and pelletizing.

The mixing of the hydrous aluminum oxide, whether in gel form or dried, with the potassium pyrosulfite effected the release of some $SO_2$ vapors and the production of some potassium sulfate even before heating or contacting with the reducing agent. In two runs the amount of sulfur loss through this ment wherein the metal pyrosulfite is present in the reduction zone in physical admixture with particulate alumina in a weight ratio of about 0.05 to 1 part of said alumina per part of said pyrosulfite.

2. The improvement of claim 1 wherein the alumina is supplied to the admixture in precursor form as hydrous aluminum oxide.

3. The improvement of claim 2 wherein the physical admixture of the metal pyrosulfite and the hydrous aluminum oxide is a pelletized admixture, said pellets having a longest dimension of about 1 to 2 inches and a shortest dimension of about 0.8 to 1.4 inches.

4. The improvement of claim 2 further including (a) recovering the metal sulfide-containing product produced by the contacting, (b) mixing said product with about 2 to 4 parts of water, per each part by weight of said product, to essentially completely dissolve the metal sulfide and any corresponding metal aluminate present in the product, and (c) contacting the resultant aqueous mixture with carbon dioxide at a temperature in the range of about 100° to 225° F. to (i) convert the metal sulfide, water, and carbon dioxide to the corresponding metal carbonate and hydrogen sulfide and (ii) to convert the metal aluminate to the corresponding metal carbonate and hydrous aluminum oxide.

5. The improvement of claim 4 wherein hydrous aluminum oxide produced by the contacting is recovered and recycled to the reduction zone.

6. The improvement of claim 1 wherein the metal pyrosulfite is potassium pyrosulfite.

7. The improvement of claim 1 wherein carbon monoxide is employed as reducing agent and the contacting is conducted at about 1,200° to 1,800° F.

8. The improvement of claim 1 wherein hydrogen is employed as reducing agent and the contacting is conducted at about 1,200° to 1,800° F.

9. The improvement of claim 1 wherein the metal pyrosulfite is potassium pyrosulfite and a gaseous mixture of carbon monoxide and hydrogen is employed as reducing agent.

10. The improvement of claim 4 wherein the metal pyrosulfite is potassium pyrosulfite.

* * * * *